United States Patent [19]
Leto et al.

[11] 3,859,785
[45] Jan. 14, 1975

[54] TURBINE ENGINE WITH INTEGRAL COMPRESSOR AND ALTERNATOR ROTOR

[75] Inventors: Anthony Leto, Franklin Lakes, N.J.; Richard F. Jaklitsch, Yonkers, N.Y.; Edward R. Ackerman, North Haledon, N.J.

[73] Assignee: Curtiss-Wright Corporation, Wood-Ridge, N.J.

[22] Filed: Dec. 17, 1973

[21] Appl. No.: 425,262

[52] U.S. Cl. ............................. 60/39.33, 60/39.66
[51] Int. Cl. ........................... F02g 3/00, F02c 7/12
[58] Field of Search ........... 290/52; 60/39.66, 39.14

[56] References Cited
UNITED STATES PATENTS
2,508,397 5/1950 Kane ........................................ 290/2
3,071,691 1/1963 Hadded et al. ........................ 290/52

*Primary Examiner*—C. J. Husar
*Assistant Examiner*—Thomas I. Ross
*Attorney, Agent, or Firm*—Raymond P. Wallace

[57] ABSTRACT

A gas turbine engine in which the generator or alternator for supplying electrical requirements of the engine has its armature rotor integrally mounted on the forward end of the compressor shaft and driven thereby, the armature rotor serving as the locknut for the forward main bearing of the compressor shaft. The alternator or generator, with such auxiliary equipment as rectifier and voltage regulator, is thus housed within the main engine housing, eliminating the manufacturing expense and the complicated assembly problems of the additional housing pod, gear drive, and power takeoff used in the prior art.

5 Claims, 2 Drawing Figures

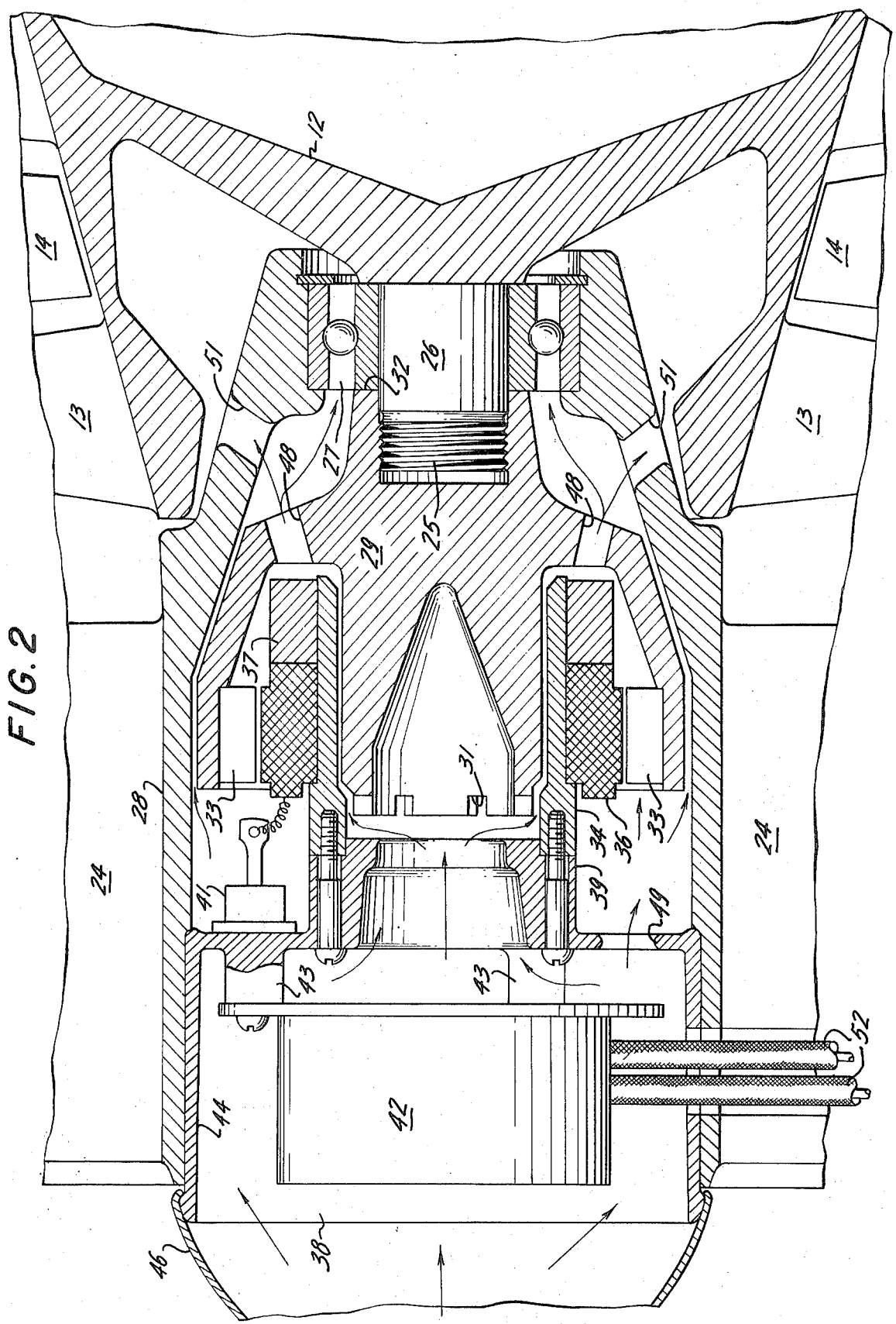

TURBINE ENGINE WITH INTEGRAL COMPRESSOR AND ALTERNATOR ROTOR

BACKGROUND OF THE INVENTION

This invention relates to gas turbine engines, and more particularly to an arrangement and means of mounting and driving the electrical supply equipment of the engine by combining it with the compressor into a single unit. The invention herein described was made in the course of or under a contract or subcontract thereunder with the Department of the Navy.

It has been the practice in the prior art to provide a generator or alternator for supplying the electrical requirements of a turbine engine, with the generator axis displaced from that of the turbine, sometimes parallel and sometimes at an angle thereto. Such arrangements require special mounting pads or brackets positioned on the engine, usually near the forward end, and a power take-off or gearbox coupled to the compressor. The generator is enclosed in its own housing, and it as well as the gears and coupling means are in turn enclosed in a pod on the turbine housing. There are thus a number of parts to be manufactured, carefully mounted and assembled, and aligned at installation, which is expensive both from the manufacturing precision and the assembly labor required.

The prior art practice also requires considerable wiring to the rectifier and voltage regulator which are usually located apart from the alternator, cooling means for the rectifier and regulator, bearings for the alternator drive, and various other elements. This equipment is expensive, bulky, and heavy.

SUMMARY

The present invention provides a combination wherein the electrical generating means for the engine is positioned upstream from the compressor in the air intake zone of the engine and coaxial with the compressor. The rotary armature of the generating means such as an alternator or generator is mounted in an integral manner on an axial extension of the compressor shaft and is driven thereby at the same rotational speed as the compressor. The electrical rotor serves as the locknut for the main bearing of the compressor, and the alternator requires no other bearings. The stator portion of the generating unit is mounted on the engine structure and positioned on the engine axis, and the rectifier and voltage regulator are disposed upstream therefrom in the air intake zone and receive ram air for cooling. This arrangement avoids the necessity for many parts required in the prior art, and obviates the complexity of assembly formerly required.

It is therefore an object of this invention to provide an improved combination of a turbine engine with its electrical supply. It is another object to provide a turbine engine having the rotor of the electrical supply integral with the compressor rotor, eliminating multiple parts and mounting means, and reducing assembly time.

A further object is to provide a turbine engine having an electrical supply driven directly by the engine shaft at the same speed, so that the output of the electrical supply can be used as a speed sensor for fuel control and other accessories.

Other objects and advantages will become apparent on reading the following specification in connection with the accompanying drawings.

BRIEF DESCRIPTION OF THE DRAWINGS

FIG. 2 is a fragmentary elevation in cross-section of the forward end of the compressor with its associated electrical generating equipment.

DESCRIPTION OF A PREFERRED EMBODIMENT

Figure 1:
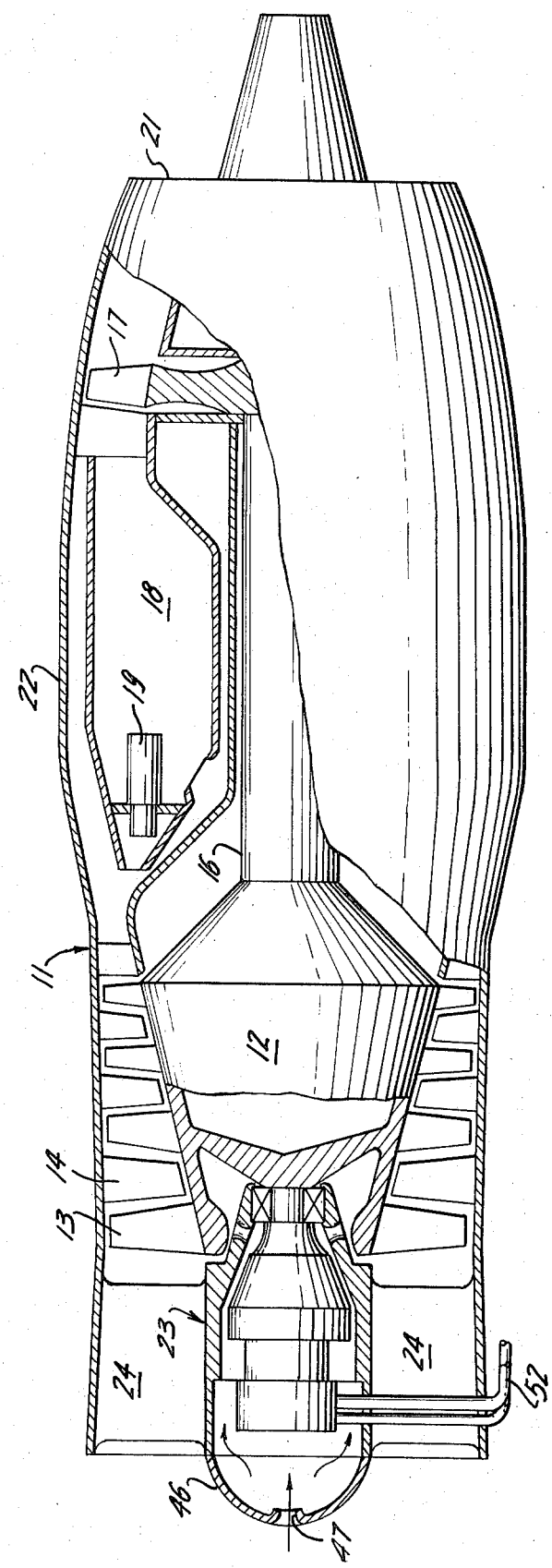
FIG. 1 is an elevational view, partly in cross-section, of a turbine engine incorporating the invention.

In FIG. 1 there is shown a general view of a turbine engine 11 incorporating the invention. Although shown in combination with a one-spool engine, the invention is equally applicable to two-spool or multispool engines.

The basic elements of the engine are conventional, comprising a compressor rotor 12 bearing radially disposed compressor blades 13, rotatable between stator vanes 14 extending radially inwardly from the engine housing, a shaft 16 for driving the compressor, and a turbine rotor 14 which drives the compressor shaft. The compressor delivers air to the combustion chamber 18 where it is mixed with fuel from a fuel supply (not shown) delivered to the combustion chamber by nozzles 19 and ignited, the resulting combustion gases driving the turbine rotor and subsequently being exhausted through the exhaust nozzle 21. The engine is enclosed within a housing shell 22. Other elements, accessories, and appurtenances of such an engine are omitted from the drawing as not being essential to an understanding of the invention.

Upstream from the compressor and positioned coaxially therewith in the air intake zone is the electrical generating means 23 for the engine, supported by struts 24 extending inwardly from housing 22, the rotary portion of the generating means being integral with the compressor shaft. The term integral is used herein to mean that the electrical rotor is coaxial with the compressor and rotating at the same speed, firmly fixed to the compressor shaft, and detachable therefrom only by intentional disassembly. The electrical generating means 23 is shown in an enlarged view in FIG. 2.

FIG. 2 shows in cross-section the forward end of the compressor rotor 12, having a journal portion 26 supported in a bearing 27. The struts 24 extend inwardly from the engine housing and support and position a generally cylindrical support member 28 coaxial with the compressor, upstream therefrom and disposed in the air intake portion of the engine. The downstream end of support member 28 also seats and positions the forward main bearing 27 of the compressor. The journal portion 26 of the compressor rotor has an extension 25 forward of the bearing having a male thread thereon, on which is integrally mounted by a mating female thread the rotor 29 of the electrical generating system 23. Electrical rotor 29 is formed of magnetic material, preferably high strength steel to withstand the rotational stresses encountered, and has a general cup-shape to conform to its environment. It will be understood that it may have any other shape suitable to a particular installation.

The rotor 29 is provided with wrenching means such as the slots 31, or spanner apertures or lugs, at any convenient location for screwing it firmly onto the threaded end of the compressor shaft. The male thread of the compressor shaft extension 25 and the mating female thread of the rotor are cut in such a direction that rotation of the compressor would provide tightening torque. The downstream end of electrical rotor 29 is provided with a flat face or shoulder 32 which seats against the inner race of bearing 27, serving as a locknut therefor so that the inner race turns with the compressor rotor whereas the outer race remains stationary in its seat in the bearing support. The rotor 29 when assembled to the compressor is screwed up to a torque value which will prevent loosening from inertial torque on shutdown of the engine or from accidental blade rubbing in the compressor. Electrical rotor 29 has a hollow interior with a plurality of pole pieces 33 disposed around its inner circumference surrounding the stator of the electrical generating system.

The stator of the generating system comprises a cylindrical barrel 34 nested within the cup of the rotor 29, and bearing on its outer circumference the stator coil 36 concentric with the magnets 33, and the field coil 37 downstream therefrom. The stator 34 is positioned coaxially with the rotor 29 and in appropriate axial spacing by a generally cylindrical casing 38 or other suitable member held in the support member 28 and having a downstream extension 39 on which the stator barrel 34 is mounted, as by the screws shown or other conventional means. Rectifying means, such as the silicon diode rectifier 41 is also borne by the member 38 and appropriately connected into the electrical generating system. A voltage regulator 42 is mounted on bosses 43 or other convenient means on the supporting member 38.

Member 38 has a cylindrical portion 44 providing a close fit within the inner diameter of support member 28, which provides coaxial positioning of the stator with the other elements of the electrical generating system. A shoulder is also provided as an axial stop. The two parts 28 and 38 may be retained in their properly assembled relation by bolts, brazing, or mating screw threads. However, since temperatures at this location are not excessive, an epoxy or other suitable adhesive may be used between their mating diameters.

The entire electrical generating system for the engine is thus positioned on the axis of the air intake for the compressor in space which would otherwise be vacant, therefore avoiding the necessity for a pod or other protuberance on the engine housing. The front end of the generating system is substantially closed by a nose fairing 46 (best shown in FIG. 1) which may be domed as shown or of other desired form, and which directs incoming air to the annular space in which the compressor blades revolve. The nose fairing may be retained by snapping it over an appropriate rim or beading provided on element 38 or other convenient member, or may also be retained by adhesive, bolting, brazing, or the like.

The generating system requires some degree of cooling, particularly the voltage regulator, such as may be obtained by air flow past the parts. For this reason the nose fairing 46 is provided with an aperture 47 which receives cooling air from the general air flow entering the compressor. As shown by the arrows, the cooling air coming through aperture 47 largely impinges on the voltage regulator 42, then passes through the generally cylindrical body of element 38. A portion of such air passes through the barrel portion 39 of elemnt 38 and thus into the interior of the barrel 34 of the stator, between the inner wall of the stator barrel and the central portion of the electrical rotor 29, and out apertures 48 in the rearmost cup portion of the rotor. Another part of the air passes through apertures 49 near the periphery of element 38 between bosses 43, some of this air passing between the stator coil 36 and the rotor pole pieces 33, over the field coil 37, and hence out through apertures 48 in the rotor. Some air also passes around the outer circumference of rotor 29.

Thus, all parts of the generating system are bathed in a constant flow of cooling air. All such air is then received in the downstream end of support member 28, some of it going through the bearing 27, and some out through apertures 51 in support member 28, into cavities in the compressor rotor 12, from which it is returned to the main air stream passing through the compressor blades 13.

Electrical leads such as those indicated at 52 may be brought into and out of the generating system at any selected point. Since the alternator is driven directly by the compressor and rotates at the same speed, an electronic fuel control may be built into the engine system at any desired location, using this alternator for its speed sensing requirements. Any other required accessories which are independently driven may be disposed at any desired location, using the alternator as their required speed sensor. This makes a very compact low cost arrangement for general aviation or for expendable engine configurations.

It will be apparent that the present invention, by mounting the electrical generating system axially on an extension of the compressor shaft in a space otherwise unused, provides a direct drive for the generating system and eliminates a considerable number of the parts and the assembly operations required in the prior art, and avoids the necessity for an exterior protuberance or pod which would disturb the smooth flow of the external air over the engine. The installation is positioned in the most favorable location for cooling without auxiliary equipment, and presents considerable cost saving in manufacture and installation.

What is claimed is:

1. A gas turbine engine having an outer shell, an air intake zone at one end of the shell, a compresor downstream from the air intake zone, a shaft driving the compressor, and a turbine rotor driving the shaft, all coaxially disposed within the shell, wherein the improvement comprises:
   a. struts extending radially inwardly from the engine shell in the intake zone and supporting a generally cylindrical hollow member coaxial with the compressor shaft and upstream therefrom;
   b. electrical generating means disposed within the cylindrical hollow member and having a stator portion and a rotary portion, the rotary portion being integrally coupled to the compressor shaft and rotatable therewith;
   c. the downstream end of the cylindrical hollow member seating and positioning a bearing, and the forward end of the compressor shaft having a journal portion journaled in the bearing.

2. The combination recited in claim 1, wherein the compressor shaft journal portion has a threaded portion extending forwardly of the bearing, the rotary portion of the generating system has a mating thread integrally afffixed to the compressor shaft threaded portion, the rotary portion of the generating system having at its downstream end a flat portion seated against the bearing and locking the inner race thereof to the compressor shaft.

3. The combination recited in claim 2, wherein the stator portion of the electrical generating system is supported by the cylindrical hollow member coaxial with the rotary portion and in electrical generating relationship therewith.

4. The combination recited in claim 3, wherein the upstream end of the cylindrical hollow portion is substantially closed by a nose fairing, the nose fairing having an aperture therein for entry of cooling air therethrough, the cooling air passing over all portions of the electrical generating system and the compressor bearing.

5. The combination recited in claim 4, wherein the cooling air after passing over the elements of the generating system and the compressor bearing is directed into the main air stream passing through the compressor blades.

* * * * *